(12) United States Patent
Schoke et al.

(10) Patent No.: US 9,682,529 B2
(45) Date of Patent: Jun. 20, 2017

(54) SANDWICH PANELS AND METHOD FOR PRODUCING SANDWICH PANELS

(71) Applicant: Airbus Operations GmbH, Hamburg (DE)

(72) Inventors: Berend Schoke, Hamburg (DE); Jens Kluesener, Hamburg (DE); Michael Doecker, Hamburg (DE); Werner Buck, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 147 days.

(21) Appl. No.: 14/555,617

(22) Filed: Nov. 27, 2014

(65) Prior Publication Data
US 2015/0147516 A1   May 28, 2015

(30) Foreign Application Priority Data
Nov. 27, 2013  (DE) .......................... 10 2013 224 203

(51) Int. Cl.
| | |
|---|---|
| *B32B 3/12* | (2006.01) |
| *B32B 7/12* | (2006.01) |
| *B32B 27/06* | (2006.01) |
| *B32B 29/00* | (2006.01) |
| *B29C 44/12* | (2006.01) |
| *B29L 31/60* | (2006.01) |

(52) U.S. Cl.
CPC .............. *B32B 3/12* (2013.01); *B29C 44/1214* (2013.01); *B32B 7/12* (2013.01); *B32B 27/06* (2013.01); *B32B 29/002* (2013.01); *B29L 2031/608* (2013.01); *B32B 2260/028* (2013.01); *B32B 2260/046* (2013.01); *B32B 2307/51* (2013.01); *B32B 2605/18* (2013.01); *Y10T 29/49826* (2015.01)

(58) Field of Classification Search
CPC ....................................................... B32B 3/12
USPC ............................................................ 428/73
See application file for complete search history.

(56) References Cited

U.S. PATENT DOCUMENTS

| | | |
|---|---|---|
| 2,607,447 A | 8/1952 | Tuttle |
| 3,716,092 A | 2/1973 | Serewicz |
| (Continued) | | |

FOREIGN PATENT DOCUMENTS

| | | | |
|---|---|---|---|
| DE | 19731604 | 1/1999 | |
| DE | 19731604 A1 * | 1/1999 | ............... B32B 3/06 |
| (Continued) | | | |

OTHER PUBLICATIONS

German Search Report, Nov. 27, 2013.
European Search Report, Feb. 11, 2015.

*Primary Examiner* — Brent O'Hern
(74) *Attorney, Agent, or Firm* — Greer, Burns & Crain Ltd.

(57) ABSTRACT

A sandwich panel with at least one insert for forming a local reinforcement, which insert is smaller than a distance between the cover layers of the sandwich panel. A difference between the distance between the cover layers and a length of an extension of the insert including a previously viscous expansion compound with adhesive properties, which expansion compound has solidified during the pressing of the sandwich panel, is compensated for. A sandwich panel with at least one previously elastic insert whose original extension as a result of deformation during pressing of the sandwich panel is reduced. A method for producing such sandwich panels.

13 Claims, 6 Drawing Sheets

(56) References Cited

U.S. PATENT DOCUMENTS

| | | | |
|---|---|---|---|
| 4,399,642 | A | 8/1983 | Bard et al. |
| 4,981,735 | A | 1/1991 | Rickson |
| 5,093,957 | A | 3/1992 | Do |
| 5,135,799 | A | 8/1992 | Gross et al. |
| 2003/0187099 | A1 | 10/2003 | Dean |
| 2006/0241251 | A1 | 10/2006 | Bugg |
| 2008/0233347 | A1* | 9/2008 | Chefdeville .......... B29C 70/088 428/116 |
| 2012/0043019 | A1 | 2/2012 | Belpaire |

FOREIGN PATENT DOCUMENTS

| | | |
|---|---|---|
| DE | 102009010961 | 9/2010 |
| EP | 0443364 | 8/1991 |
| EP | 1024301 | 8/2000 |
| EP | 2251250 | 11/2010 |
| GB | 921569 | 3/1963 |
| WO | 0181468 | 11/2001 |

\* cited by examiner

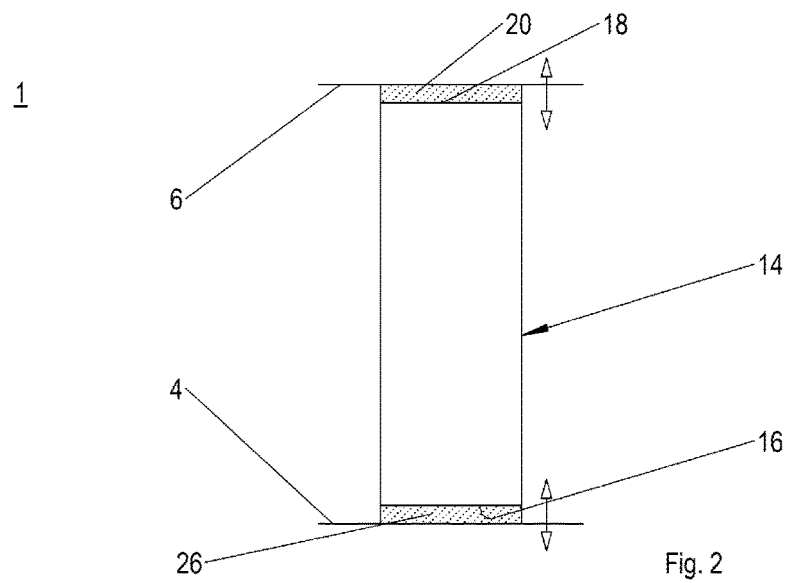
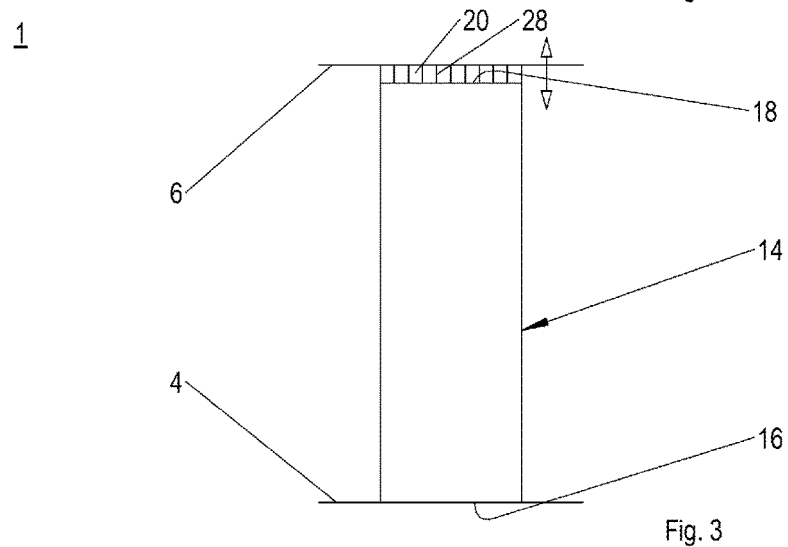
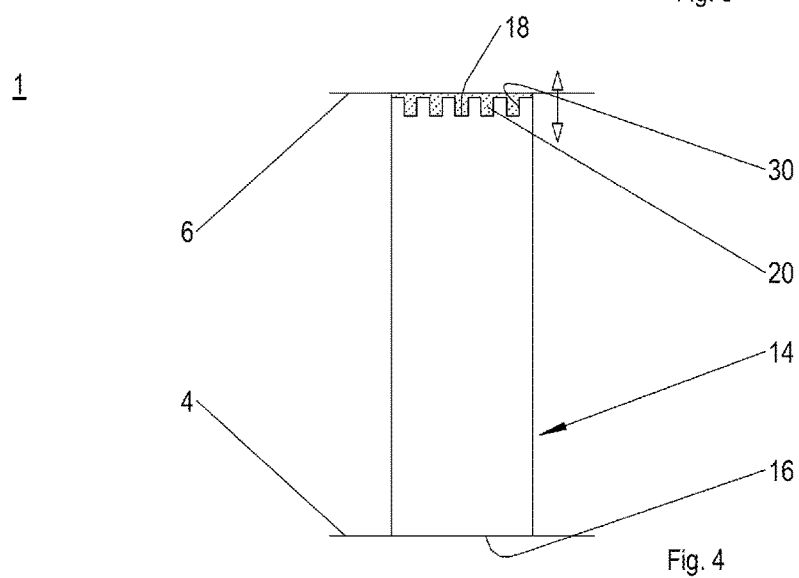

SANDWICH PANELS AND METHOD FOR PRODUCING SANDWICH PANELS

CROSS-REFERENCES TO RELATED APPLICATIONS

This application claims the benefit of the German patent application No. 10 2013 224 203.4 filed on Nov. 27, 2013, the entire disclosures of which are incorporated herein by way of reference.

BACKGROUND OF THE INVENTION

The invention relates to a sandwich panel and to a method for producing such sandwich panels.

The interior of an aircraft is predominantly formed of fiber-reinforced plastic materials. For floor lining panels and wall lining panels, for example, in many cases sandwich panels with a core structure and cover layers that cover the aforesaid on both sides are used, which sandwich panels feature great mechanical stiffness while being of a lightweight design. Frequently the core structure comprises a multitude of honeycomb cells whose walls, for example comprising a polyamide paper impregnated with a phenolic resin, are coated or impregnated. The cover layers are, for example, semi-finished fiber products, so-called prepregs, that are preimpregnated with an uncured thermoplastic or duroplastic synthetic matrix, which prepregs in the production of the sandwich panel are pressed as a compound structure with the core structure and cure as a result of the application of pressure and temperature. In order to create local reinforcements in sandwich panels, for example in order to form force transmission points, usually inserts are inserted into cutouts in the core structure and are pressed, together with the core structure and the cover layers, with the application of temperature, to form the sandwich panel. The inserts are, for example, cured fiber composite components, while the cover layers are, for example, uncured semi-finished fiber composite products, such as so-called prepregs, that are preimpregnated with a resin matrix. In order to avoid uneven features or fluctuations in the thickness of the sandwich panel the at least one insert must comprise an extension that corresponds to a cover layer distance. Likewise, in the case of a multitude of inserts, their extension must not vary. In a known production method the compound structure is arranged between two rigid pressure plates and is pressed by means of the aforesaid. If the at least one insert is too large, it is not possible to optimally connect the core structure in the immediate vicinity of the insert to the cover layers. In the surroundings of the at least one insert a so-called pressure shadow is formed. In contrast to this, if the at least one insert is too small, in turn connection problems relating to the at least one insert can occur because only the core structure is subjected to the command pressure.

From EP 1 024 301 A2 a variable-thickness or variable-height insert is known that comprises two components which after the production of a sandwich panel are inserted in sections into a through-hole of the sandwich panel. The insert components in each case comprise a flange for resting externally against the sandwich panel, and in each case a bottom that points radially inwards. The bottoms comprise an opening for receiving a screw for connecting the sandwich panel to a surrounding structure. The insert components are bonded to the sandwich panel by way of an adhesive, wherein in the case in which the sandwich panel is thicker than the extension of the insert components between their flanges, the adhesive enters the gap between the bottoms and cures.

From U.S. Pat. No. 5,093,957 a sandwich panel is known whose at least one insert also comprises a multi-component design, with the insert after production of the sandwich panel being inserted into a cutout of the sandwich panel. After the production of the sandwich panel the inserts are inserted into a through-hole of the sandwich panel, wherein each of said inserts rests by a flange against the exterior of the sandwich panel. In each case a tubular projection extends from each flange, wherein the projections are designed so that they can be slid into each other. Fixing the insert components relative to each other and in the sandwich panel takes place by means of an adhesive that surrounds the projections on the external circumference.

U.S. Pat. No. 3,716,092 shows a sandwich panel with a multi-component insert that after the production of the sandwich panel is inserted into a one-sided cutout of the sandwich panel. The insert comprises a bottom component with a tubular projection that over its entire surface rests against the inside of a bottom cover layer, and a top component with a tubular projection that in the installed state finishes off flush with the outside of a top cover layer. During installation the bottom insert is inserted into the one-sided recess of the sandwich panel, and then the top insert component is slid onto the bottom insert until it finishes off so as to be flush with the top cover layer. In this process an adhesive is laterally pressed out of a space between the insert components. A quantity of adhesive remaining between the insert component cures.

Further prior art is known from U.S. Pat. No. 4,399,642, U.S. Pat. No. 2,607,447A, U.S. Pat. No. 4,981,735, GB 921 569 and DE 10 2009 010 961 A1.

SUMMARY OF THE INVENTION

It is an object of the invention to create sandwich panels comprising at least one integral insert, wherein no pressure shadows and/or undesirable uneven features of cover layers occur in the surrounding region of the at least one insert, and wherein any unreliable connection of a core structure in the surrounding region of the at least one insert is prevented. Furthermore, it is an object of the invention to create a method for producing such sandwich panels.

A sandwich panel according to the invention comprises a core structure, cover layers arranged on both sides of the core structure, and at least one insert for forming a local reinforcement, in particular for forming a force transmission point. Preferably, the core structure comprises a multitude of honeycomb cells. According to the invention the at least one insert is arranged between the cover layers, wherein said insert is smaller than the cover layer distance, and the difference between its extension and the cover layer distance of at least one cured expansion compound is compensated for by means of adhesive characteristics.

The insert comprises quasi two sections, wherein one section (the actual insert) is already cured at the time of installation of the sandwich panel, and the other section (the expansion compound) is viscous during installation of the sandwich panel, and is thus elastic, and cures only subsequently. As a result of the expansion compound, the insert quasi adapts to the particular thickness or, depending on the view, to the height, of the sandwich panel, and consequently any pressure differentials in the sandwich panel are reduced and homogenous characteristics are achieved in the individual panel regions. Pressure shadows and/or undesirable uneven features of the cover layers in the surrounding region of the at least one insert are prevented in this manner. Likewise, the core structure in the surrounding region of the at least one insert is always reliably connected because the pressure plates cannot support themselves on the insert. Because the viscous section, apart from its expansibility, furthermore comprises adhesive characteristics, the insert is at the same time affixed, in particular integrally connected, to the cover layers on the side of the expansion compound. Depending on the design of the insert and of the cover layers, connection of the insert to the other cover layer can take place by way of an adhesive and/or by way of the insert's own resin material. During pressing of the sandwich panel, any excess quantity of expansion compound can be laterally displaced into the core structure and can thus at least in this region establish a connection with the core structure. The expansion compound is, for example, a honeycomb adhesive on a duromer base, for example an epoxy base or thermoplastic base, with a certain degree of expansion. The degree of expansion, for example up to 300%, is guided by the extension of the insert and by the cover layer distance. An alternative expansion compound is thermoplastic based.

In a preferred exemplary embodiment the expansion compound is arranged at least between the insert and a cover layer. With end face arrangement of the expansion compound the aforesaid can be positioned in a simple manner. Furthermore, in this manner the required type and quantity of expansion compound can easily be determined.

As an alternative or in addition, the at least one insert per se can comprise a multi-component design, wherein the expansion compound is arranged at least between the insert components. As a result of the multi-component design of the insert, said insert can be of a modular design so that various inserts can be individually adapted to the particular sandwich panel used. Because the expansion compound is arranged at least between the insert components there is no need to provide a separate adhesive between the insert components.

In one exemplary embodiment the insert components cooperate with positive-locking fit. This results in mechanical stabilization of the integral connection of the cured expansion compound.

In one exemplary embodiment fibers are arranged in the expansion compound. Said fibers can be anchored in the at least one insert and can extend from the insert into the expansion compound, and/or they can be embedded in the expansion compound so as to be detached from the at least one insert. The fibers act as a reinforcement device, thus resulting, for example, in great stability of the expansion compound in the face of tensile loads and shear loads.

As a supplement or as an alternative to the fibers, the at least one insert can be structured in the region of the expansion compound. Structuring, for example in the form of elongated indentions, results in an increase in the connection surface of the at least one insert, which connection surface receives the expansion compound.

In one exemplary embodiment the at least one insert is at least in some sections circumferentially bonded to the core structure. As a result of the connection of the at least one insert with the core structure, connection of the at least one insert not only takes place on the end faces with the cover layers but also laterally and in particular outside the expansion compound region, and consequently the connection of the at least one insert is improved in terms of exposure to loads.

Preferably, lateral connection of the at least one insert to the core structure takes place by means of a foam adhesive or an adhesive material that expands during curing. The foam adhesive can, in particular, be equal to the expansion compound. For the purpose of creating a receiving space for the foam adhesive, the at least one insert can have a body portion comprising a reduction in its cross section, for example a waist-like shape, when compared to body portions on the side of the cover layers. For example, the insert can also comprise an I-shaped profile. A waist-shaped profile or a profile of this type can easily be formed in terms of engineering effort. Furthermore, as a result of the reduction in the cross section or as a result of the receiving space the at least one insert has a reduced weight. This is advantageous in particular in the case of shear loads that require large connection surfaces of the at least one insert to the cover layers.

In a method according to the invention for forming such a sandwich panel, prior to covering a core structure on both sides with cover layers, at least one insert that has a lesser expansion than a command cover layer distance or a cover layer distance is inserted, together with at least one viscous expansion compound with adhesive characteristics, into a cutout of the core structure, and together with the core structure and the cover layers is pressed to form the sandwich panel, wherein the expansion compound expands and cures.

In order to achieve a reliable setting of the command cover layer distance it is advantageous if the at least one viscous expansion compound is provided at a thickness sufficient for the viscous expansion compound together with the at least one insert prior to pressing to form an extension that is greater than the command cover layer distance. Any excess expansion compound is laterally pressed away during pressing. Consequently, even in the improbable case in which during pressing the expansion compound does not extend as intended, the command cover layer distance is still achieved.

In this manner a sandwich panel with an integrated insert is created, wherein pressure shadows and/or undesirable uneven features of cover layers in the surrounding region of the at least one insert are prevented. Moreover, there is no longer any need for subsequent arrangement of the at least one insert. Likewise, the core structure in the surrounding region of the at least one insert is reliably connected because the pressure plates cannot support themselves on the insert.

In a preferred method the at least one insert is arranged in a not-completely-cured state in the core structure and subsequently cures during pressing. Depending on the degree of curing of the at least one insert, it is possible to do without additional adhesives for connecting the at least one insert to the cover layers in the surface regions or end face regions that do not contain expansion compound. This exemplary embodiment is thus particularly suited if the insert is a plastic-based composite material or fiber composite component, and the over layers comprise plastic-based fiber composite components or semi-finished products such as prepregs that are fiber-reinforced and that comprise cross-linking of the resin systems of the cover layer and of the at least one insert.

In an alternative sandwich panel according to the invention, with a core structure and cover layers arranged on each side, wherein the core structure comprises a multitude of, in particular honeycomb-shaped, cells, and with at least one insert for forming a local reinforcement, in particular for forming a force transmission point, the at least one insert is arranged between the cover layers, wherein it is cured and deformed when compared to an elastic original state.

Because the at least one insert in the original state is bigger than the cover layer distance of the sandwich panel, there is no need to use an expansion compound because, as a result of pressing, the at least one insert, by becoming deformed, is automatically set to the cover layer distance.

In a method according to the invention for producing the alternative sandwich panel, at least one insert is inserted in the original state in which than the command cover layer distance or the cover layer distance, is inserted in a cutout of a core structure and, together with the core structure and the cover layers, is pressed to form the sandwich panel, wherein during pressing said insert cures in the deformed state.

In this manner, likewise, a sandwich panel with an integrated insert is created, wherein pressure shadows and/or undesirable uneven features of cover layers in the surrounding region of the at least one insert are prevented. Furthermore, there is no need for subsequent arrangement of the at least one insert. Likewise, the core structure is reliably connected in the surrounding region of the at least one insert because the pressure plates cannot support themselves on the insert.

BRIEF DESCRIPTION OF THE DRAWINGS

Below, preferred exemplary embodiments of the invention are explained in more detail with reference to greatly simplified diagrammatic illustrations. The following are shown:

FIGS. 2 to 4 show single-component exemplary embodiments of the insert shown in FIG. 1;

DETAILED DESCRIPTION OF THE PREFERRED EMBODIMENTS

Figure 1:
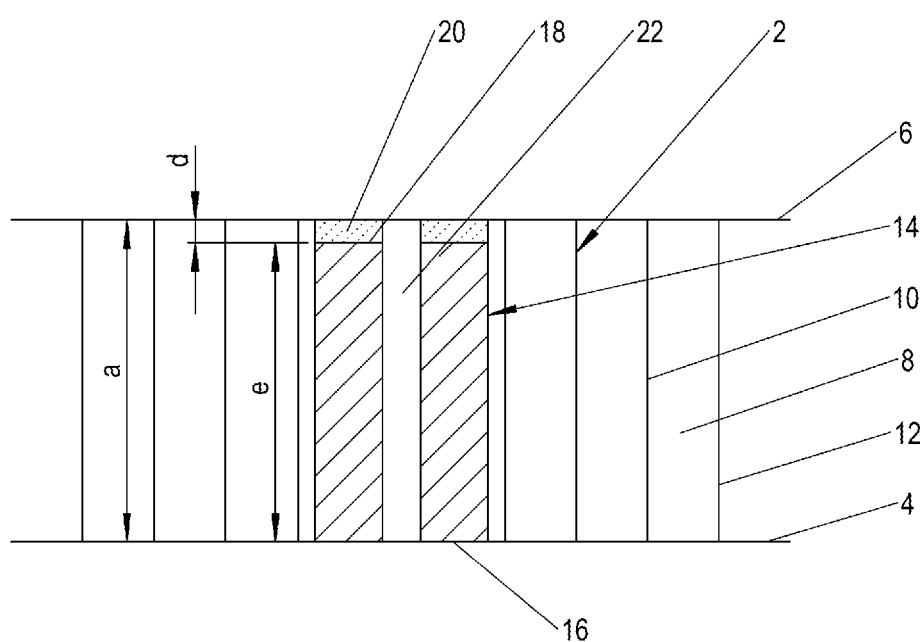
FIG. 1 shows a cross section of a sandwich panel according to the invention in the region of an insert for forming a local reinforcement, in particular for forming a force transmission point.

As shown in FIG. 1, a sandwich panel according to the invention inter alia comprises a core structure 2 that on each side comprises at least one cover layer 4, 6. The core structure 2 itself is formed from a multitude of cells which in the embodiment shown are of honeycomb shape, with one cell 8 being designated with a reference character representative of all the remaining cells. In this exemplary embodiment, the walls 10, 12 on each side of the cell 8 are formed with the use of polyamide paper, as is the case with all the remaining cells of the core structure 2, which polyamide paper is soaked, coated or impregnated with a phenolic resin. As an alternative, the polyamide paper can also comprise epoxy resin layers. The cover layers 4, 6 are, for example, semi-finished fiber products or prepregs that have been pre-impregnated with an uncured thermoplastic or duroplastic synthetic matrix.

In a single-sided recess (not designated with a reference character) of the core structure 2, a single component insert 14 is formed for forming a local reinforcement, in particular for forming a force transmission point. The insert 14 is, for example, a cylindrical body made from a cured fiber composite material and is integrally formed with the sandwich panel 1. In other words, during manufacture of the sandwich panel 1 it has been integrated or inserted in said sandwich panel 1. Said insert 14 comprises an extension e between the cover layers 4, 6, which extension is smaller than the cover layer distance a. The cover layer distance a is, in particular, equal to the thickness of the core structure 2. In the exemplary embodiment shown in the figure, the insert 14 is bonded on the inside by the bottom end face 16 to the bottom cover layer 4, and thus because of its smaller extension e when compared to the cover layer distance a, said insert 14 by its top end face 18 on the inside is spaced apart from the top cover layer 6. In this embodiment, bonding the bottom end face 16 to the inside of the bottom cover layer 4 takes place, for example, by way of a suitable adhesive. Of course, bonding can also take place by way of the resin of the insert 14 and/or the resin of the bottom cover layer 4, and it is possible to do without the use of a separate adhesive. This essentially depends on the degree of curing or the degree of cross-linking of the insert 14 and/or of the cover layer 4.

In order to compensate for a difference d between its extension e and the cover layer distance a, an expansion compound 20 is arranged between the top end face 18 and the top cover layer 6. The expansion compound 20 has been cured or solidified and has expanded during curing. Furthermore, the expansion compound 20 comprises adhesive characteristics so that not only is the difference d between the insert extension e and the cover layer distance a compensated for, but also the insert 14 has been bonded to the top cover layer 6 by means of the expansion compound 20. For example, the expansion compound 20 is a honeycomb adhesive which in the uncured state is viscous and thus elastic and which, when subjected to pressure and temperature, expands and solidifies. An epoxy adhesive with, for example, an expansion degree of 50% is a preferred expansion compound.

For the purpose of accommodating an attachment means (not shown), for example for attaching the sandwich panel 1 to a surrounding structure, the insert 14 and the expansion compound 20 comprise a hole, for example a through-hole 22. Because of the arrangement of the insert 14 on the inside, between the cover layers 4, 6, overlapping areas between the insert 14 and the cover layers 4, 6 or between the cured compensation compound 20 and the top cover layer 6 are formed, which overlapping areas are radial relative to the through-hole 22. If, for example, cross tension loads are introduced into the sandwich panel 1, for example if objects are to be suspended from the sandwich panel 1, instead of the through-hole 22, it is also possible for merely a blind hole with an internal thread as a device for accommodating a fastener to have been made in the insert 14 and in the expansion compound 20. For the sake of clarity the through-hole 22 or a comparable accommodation device is not necessarily shown in the following figures.

According to the illustration in FIG. 2, the insert 14 can also comprise expansion compound 20, 26 on each side. Arranging the expansion compound 20, 26 on each side in the region of the end faces 16, 18 obviates the need for providing and using a separate adhesive for connecting on the inside the insert 14 to at least one of the cover layers 4, 6.

FIG. 3 shows an exemplary embodiment in which fibers 28 extend from the top end face 18 of the insert 14, which fibers 28 are partly immersed in the expansion compound 20 and thus result in stabilization of the layer 26 of connecting means. The fibers 28 are attached by their ends in the insert 14, while their free sections are embedded in the expansion compound 20. Of course, it is also possible for fibers to extend from the bottom end face 16 of the insert, which fibers are then partly immersed in the expansion compound 20.

According to the illustration in FIG. 4, the end face 18 that accommodates the expansion compound 20 can also be structured; it can, for example, comprise a multitude of four parallel elongated indentations 30, in the manner of grooves, which then comprise the expansion compound 20.

In FIGS. 5 to 10 the insert 14 is a multi-component design comprising a bottom 32 and a top 34. In this design the expansion compound 20 is preferably arranged in a tolerance gap (not designated by a reference character) between the bottom 32 and the top 34. In this design the top and bottom end faces 16, 18 of the insert 14 rest, flat on the inside, against the bottom cover layer 4 or the top cover layer 6, with said insert 14 being correspondingly bonded to the aforesaid. Of course, in all the exemplary embodiments according to FIGS. 5 to 10 the expansion compound 20 can additionally be arranged on the end face.

Figure 5:
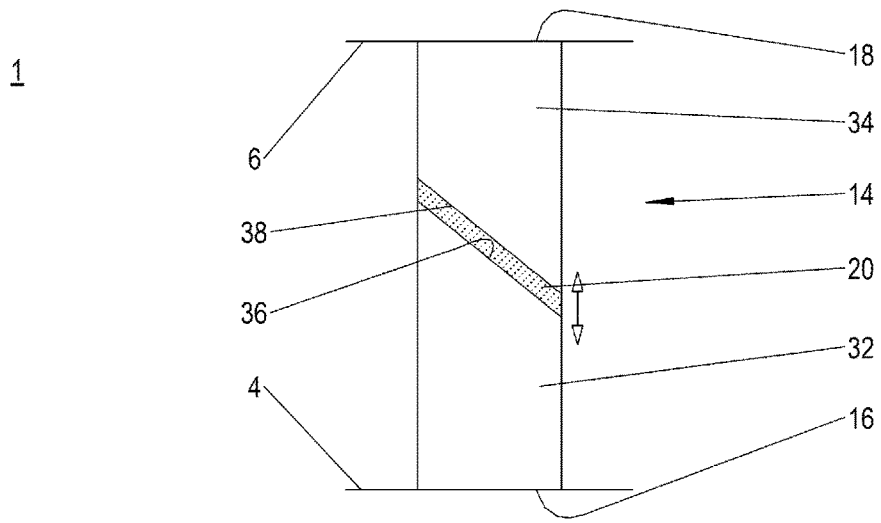
FIGS. 5 to 10 show multi-component exemplary embodiments of the insert shown in FIG. 1.

In the multi-component insert shown in FIG. 5, the bottom 32 and the top 34 are of a wedge-shaped design, wherein between their connecting surfaces 36, 38, which are surfaces inclined relative to the end faces 16, 18, the expansion compound 20 is arranged.

Figure 6:
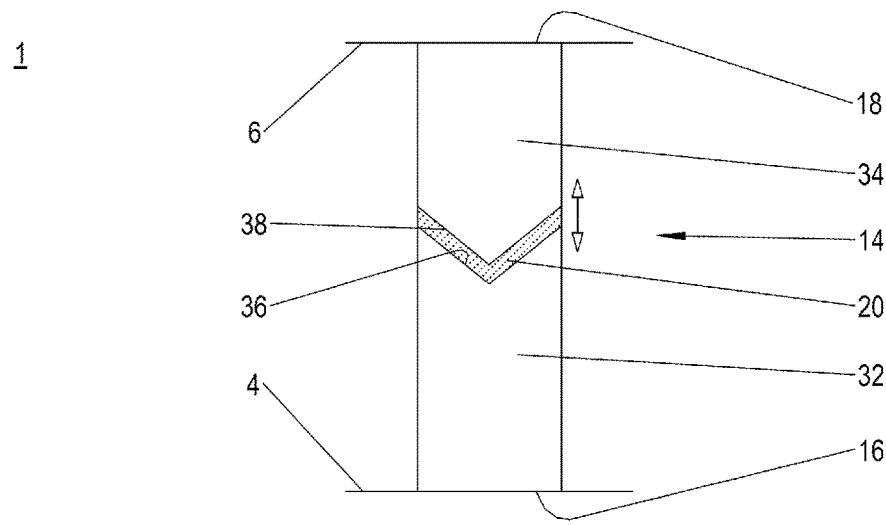

In the exemplary embodiment shown in FIG. 6, the bottom 32 comprises a V-shaped recess, and the top 34 comprises a corresponding V-shaped projection for entering the V-shaped accommodation device. In this embodiment the connecting surfaces 36, 38 are thus designed as V-shaped surfaces.

Figure 7:
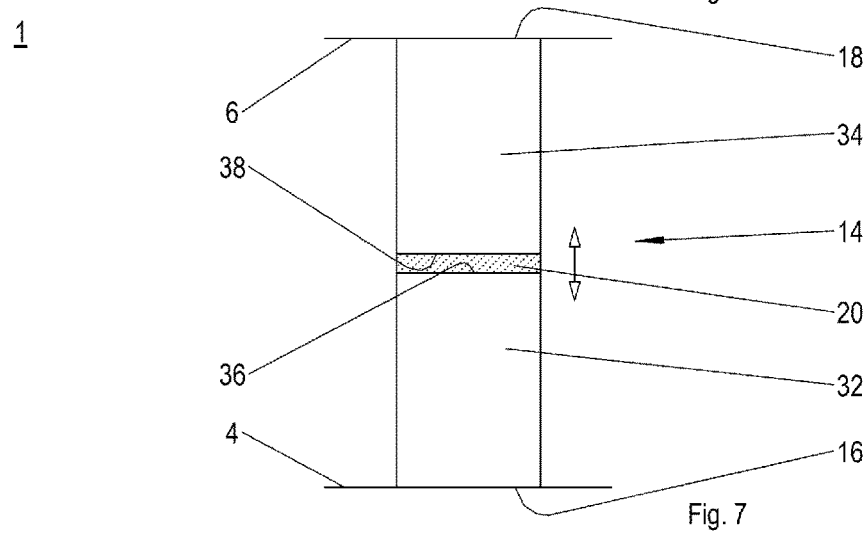

In the exemplary embodiment shown in FIG. 7, the bottom 32 and the top 34 comprise two parallel connecting surfaces 36, 38 that extend parallel to the end faces 16, 18 and thus to the cover layers 4, 6.

Figure 8:
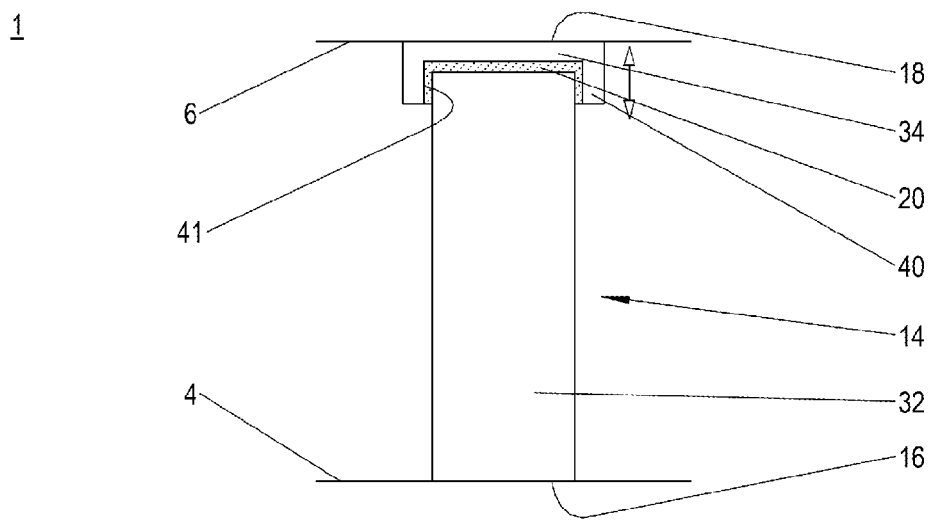

In the exemplary embodiment shown in FIG. 8, the top 34 comprises a circumferential sidewall 40 in the manner of a cap or a cup. In the region of its top end face 16, the bottom 32 is encompassed by the top 34, wherein the expansion compound 20 is arranged in the tolerance gap between the bottom 32 and the top 34. During curing 20, the expansion compound can only escape through the sidewall 40 by way of a narrow radial gap 41 between the sidewall 40 and the bottom 32, so that when the core structure 2 and the cover layers 4, 6 are pressed to form a sandwich panel 1, said expansion compound is highly compressed.

Figure 9:
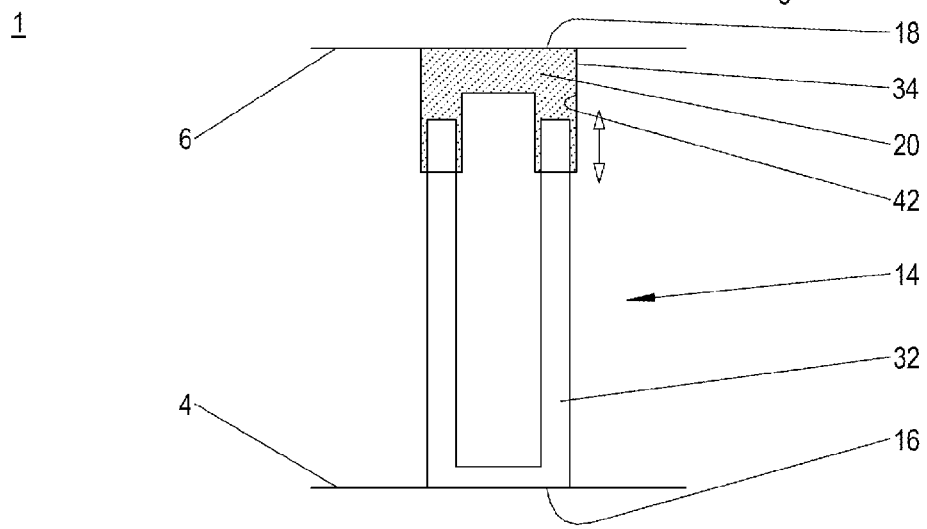

In the exemplary embodiment shown in FIG. 9, the bottom 32 and the top 34 are designed as U-profiles, wherein the top 34 comprises an interior 42 for sliding engagement with the bottom 32. The interior 42 comprises the expansion compound 20, so that during curing of the expansion compound 20, the bottom 32 and the top 34 are pressed apart until difference equalization has taken place.

Figure 10:
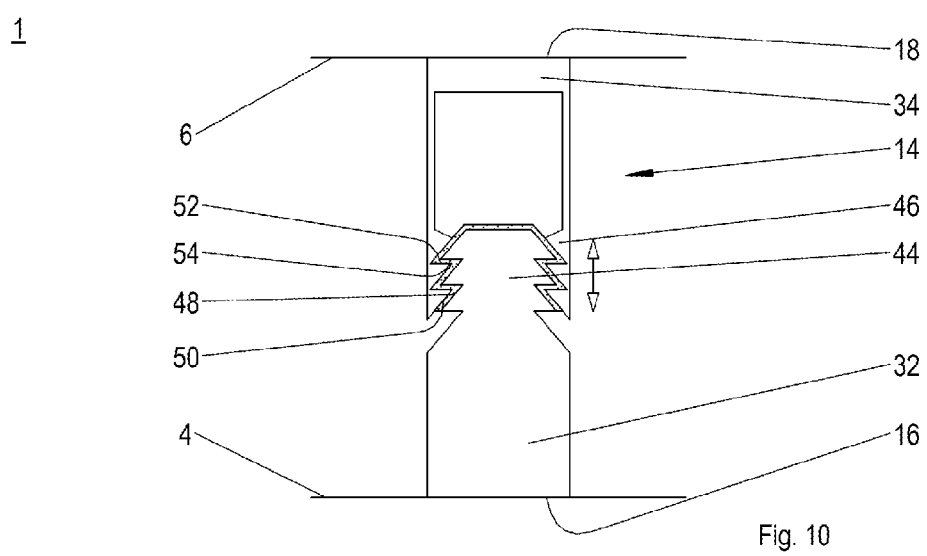

In the exemplary embodiment shown in FIG. 10, the bottom 32 comprises a locking head 44, and the top 34 is a U-shaped profile with locking projections 46 at the end for positive-locking interaction with the locking head 44. In the embodiment shown, the expansion compound 20 is arranged between the locking head 44 and the locking projections 46, so that additionally during curing of the expansion compound 20, the positive fit between the bottom 32 and the top 34 is strengthened. In this arrangement the positive fit preferably acts in such a manner that during the introduction of tensile loads, such as cross tension loads into the sandwich panel 1, the components 32, 34 are non-detachably interlocked. To this effect, in the presently illustrated exemplary embodiment, the locking head 44 and the locking projections comprise inclined planes 48, 50 that face the direction of installation, and locking surfaces 52, 54 that extend across the direction of installation.

Figure 11:
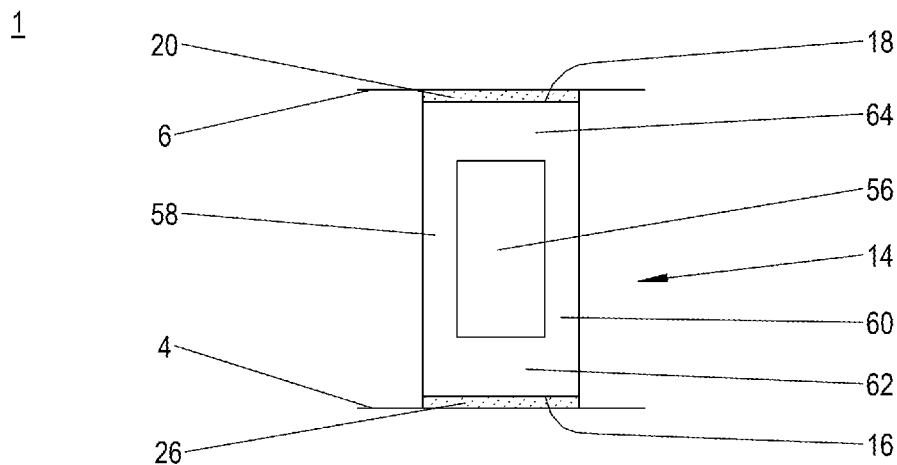
FIGS. 11 to 13 show exemplary embodiments of the insert shown in FIG. 1, which embodiments comprise a laterally-opened accommodation space for accommodating a foam adhesive for laterally cross-linking the insert to the core structure and/or for weight reduction.
Figure 12:
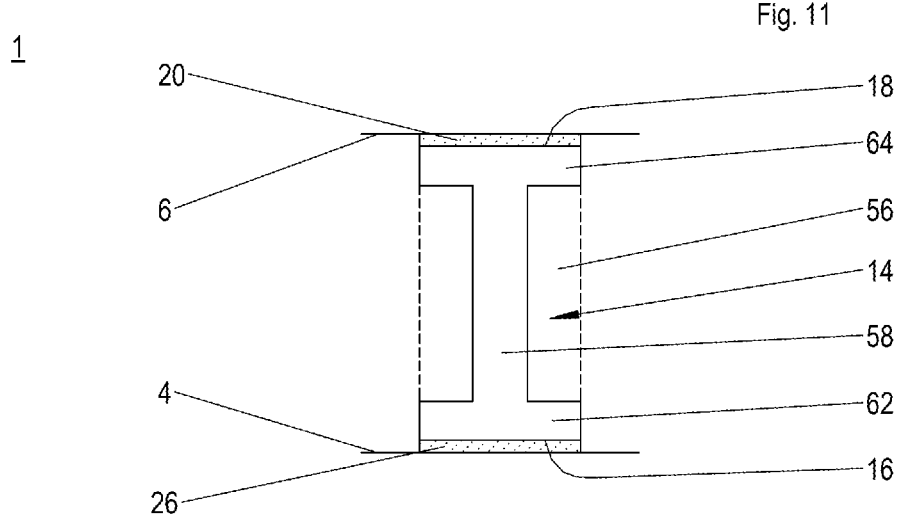
Figure 13:
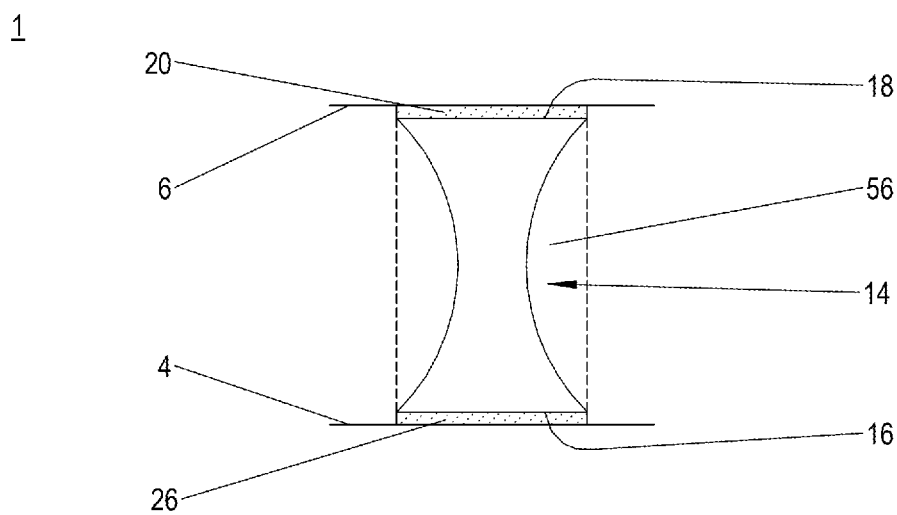

FIGS. 11 to 13 show exemplary embodiments of a single-component insert 14, which exemplary embodiments in each case comprise at least one accommodation space 56 for accommodating a foam adhesive and for lateral cross-linking of the insert 14 with the core structure 2. The foam adhesive expands during curing, thus penetrating the cell 8 that accommodates the insert 14, as a result of which in addition to the above-described connection on the cover layers, an integral connection with the core structure 2 is established. In particular, the foam adhesive can be equal to the expansion compound 20, 26.

In the exemplary embodiment shown in FIG. 11, the insert 14 is of a frame-like design comprising two parallel webs 58, 60 that are laterally spaced apart from each other and extend between a bottom flange 62 and a top flange 64. The accommodation space 56 is formed between the webs 58, 60 and the flanges 62, 64; it is at least on one side laterally open to the core structure 2. In each case the flanges 62, 64 form one of the end faces 16, 18, and in the diagram shown are, for example, in each case connected to the cover layers 4, 6 by way of the expansion compound 20.

In the exemplary embodiment shown in FIG. 12, the insert 14 has an I-shaped cross section. Accordingly, the insert 14 has a web 58 that extends in the middle between a bottom flange 62 and a top flange 64. In this arrangement the accommodation space 56 can enclose the web 58 as an annular space, or it can, for example, be divided into two partial spaces, each arranged laterally of the web 58. In the diagram shown the flanges 62, 64 are, as an example, in each case connected to the cover layers 4, 6 by way of the expansion compound 20, 26. For visually clarifying the at least one accommodation space 56, in the diagram it is laterally delimited by dashed vertical lines. Accordingly, the at least one accommodation space 56 is formed between the flanges 62, 64.

Figure 14:
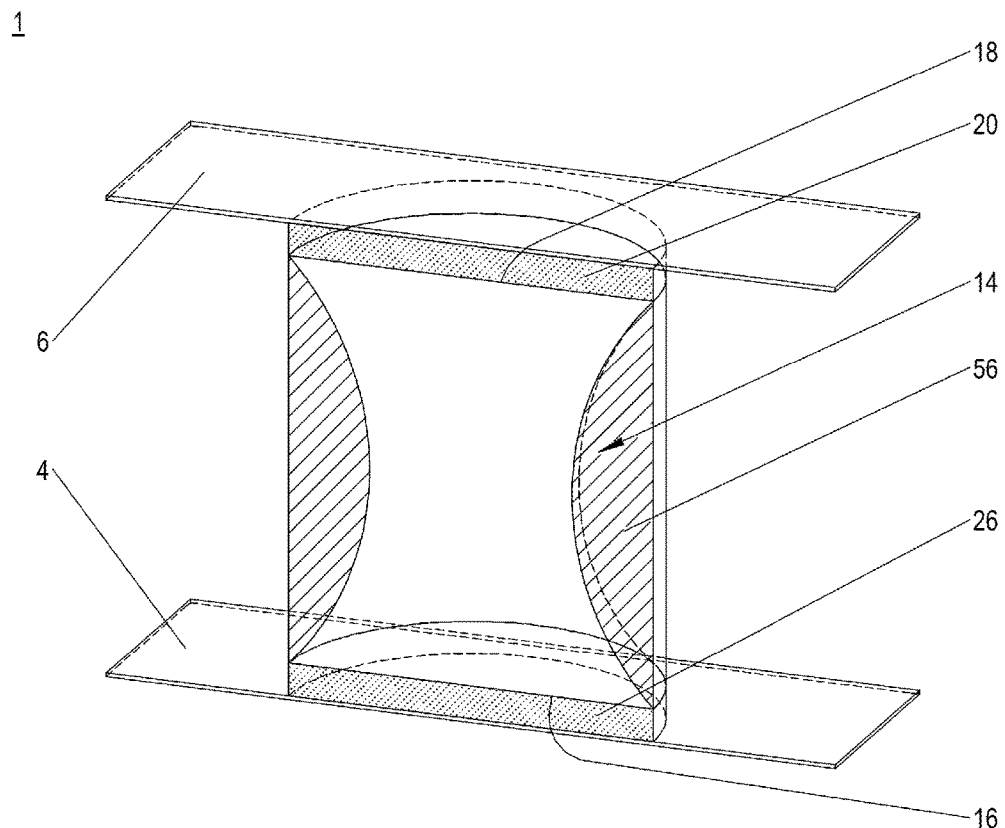
FIG. 14 shows a three-dimensional view of the insert shown in FIG. 13.

In the exemplary embodiment shown in FIG. 13, the insert 14 has a waist-like shape between its bottom end face 16 and its top end face 18. The accommodation space 56 is thus designed as an annular space with a varying cross section, with its largest cross section, as shown in FIG. 14, being arranged in the middle between the end faces 16, 18. In order to illustrate the accommodation space 56, in FIG. 14 it is shown coarsely hatched. In FIG. 14, the insert 14 is as an example, in the region of its end faces 16, 18, connected to the cover layers 4, 6 by way of the expansion compound 20, 26 arranged on each side.

In a method according to the invention for producing such a sandwich panel 1, prior to covering the core structure 2 on each side with the cover layers 4, 6, the at least one insert 14 with the at least one viscous expansion compound 20 is inserted into a recess in the core structure 2, and together with the core structure 2 and the cover layers 4, 6, is pressed to form the sandwich panel 1, wherein the at least one expansion compound 20 expands and solidifies. Preferably, in this arrangement the viscous expansion compound 20 is provided at such a thickness that the viscous expansion compound 20 together with the at least one insert 14 prior to pressing, forms an extension that is greater than the command cover layer distance. Any excess expansion compound 20 is laterally pressed away during pressing. On end faces 16, 18 of the insert 14, which end faces 16, 18 do not comprise expansion compound, a suitable adhesive is arranged for producing an adhesive connection between the respective end face 16, 18 and an inside of the cover layer 4, 6. If the insert 14 and/or the cover layers 4, 6 are compound structures comprising a resin matrix, and if they are pressed together in the uncured state, depending on the respective degree of cross-linking, it may be possible to do without the use of an adhesive between the end faces 16, 18 of the insert, which end faces 16, 18 do not comprise expansion compound, and the cover layers 4, 6, because in this case connection of the insert 14 to the cover layers 4, 6, can take place by way of the resin material of the insert 14 or of the cover layer 4, 6.

Figure 15:
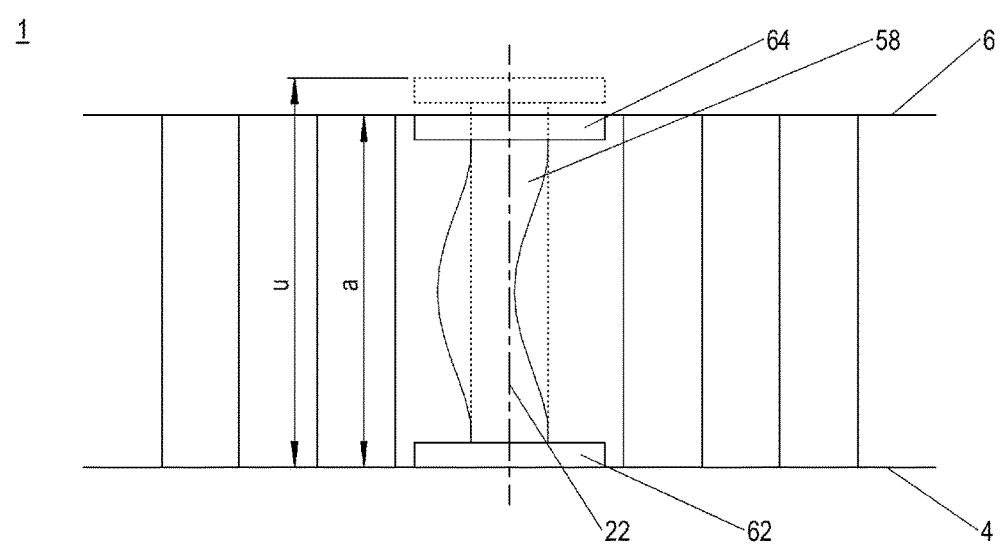
FIG. 15 shows a further exemplary embodiment according to the invention of an insert for forming a local reinforcement, in particular for forming a force transmission point.

FIG. 15 shows a sandwich panel 1 with an integrated insert 14 that without the use of the expansion compound 20 is set to a cover layer distance a of the sandwich panel 58. To this effect, in the original state the insert 14 has an extension u that is greater than the cover layer distance a or the thickness of a core structure 2 that accommodates the insert 14, between a bottom cover layer 4 and a top cover layer 6 of a sandwich panel 1. The insert 14 is, for example, an uncured fiber composite component that is deformed or upset during pressing of a core structure 4 with the cover layers 4, 6, and is thus set to the cover layer distance a. To this effect, the insert 14 has a shape that supports easy deformation while nonetheless also, for example, supporting full accommodation of a through-hole 22. In the exemplary embodiment shown in the diagram, the insert 14 is I-shaped with a web 58 that extends in the middle between a bottom flange 62 and a top flange 64. The web 58 is deformed during pressing, and thus the original extension u of the insert 14 is reduced.

In a method according to the invention for producing such a sandwich panel 1, prior to covering the core structure 2 on each side with the cover layers 4, 6, the at least one insert 14, in its original elastic state in which it is larger than the cover layer distance a, is inserted into a cutout in the core structure 2, and together with the cover layers 4, 6 is pressed to form the sandwich panel 1, wherein said insert 14 cures after its deformation.

It is expressly pointed out that even if the above-mentioned exemplary embodiments are considered individually, all the characteristics of the exemplary embodiments can be combined individually.

Disclosed are a sandwich panel with at least one insert for forming a local reinforcement, which insert is smaller than a cover layer distance of the sandwich panel, wherein a difference between its extension and the cover layer distance from a previously viscous expansion compound with adhesive properties, which expansion compound has solidified during the pressing of the sandwich panel, is compensated for; a sandwich panel with at least one previously elastic insert whose original extension as a result of deformation during pressing of the sandwich panel is reduced; as well as a method for producing such sandwich panels.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

LIST OF REFERENCE CHARACTERS

1 Sandwich panel
2 Core structure
4 Bottom cover layer
6 Top cover layer
8 Cell (honeycomb design)
10 Wall (cell)
12 Wall (cell)
14 Insert
16 Bottom end face
18 Top end face
20 Expansion compound
22 Through-hole
26 Expansion compound
28 Fiber
30 Elongated indentation
32 Bottom/insert component
34 Top/insert component
36 Connecting surface
38 Connecting surface
40 Sidewall
41 Radial gap
42 Interior
44 Locking head
46 Locking projections
48 Inclined plane
50 Inclined plane
52 Locking surface
54 Locking surface
56 Accommodation space
58 Web/body portion
60 Web/body portion
62 Bottom flange/body portion
64 Top flange/body portion
e Extension
a Cover layer distance
d Difference
u Extension in the original state

The invention claimed is:

1. A sandwich panel comprising:
 a core structure and
 cover layers arranged on each side of the core structure, and spaced apart from each other by a distance,
  the core structure comprising:
  a multitude of cells, and
  at least one insert arranged to form a local reinforcement,
   the at least one insert being arranged between the cover layers,
  wherein said insert is smaller than a cover layer distance between the cover layers, and a difference between its extension and the cover layer distance of
  at least one cured expansion compound is compensated for with adhesive characteristics;
  wherein the at least one insert comprises two sections, filling a distance between a length of the insert and the distance between the cover layers, wherein one section is cured at a time of installation of the sandwich panel, and another section is viscous during installation of the sandwich panel.

2. The sandwich panel according to claim 1, wherein the expansion compound is arranged at least between the insert and at least one cover layer.

3. The sandwich panel according to claim 1, wherein the at least one insert comprises a multi-component design, and the expansion compound is arranged at least between components of the insert.

4. The sandwich panel according to claim 3, wherein components of the at least one insert cooperate with each other with a positive-locking fit.

5. The sandwich panel according to claim 1, wherein fibers are arranged in the expansion compound.

6. The sandwich panel according to claim 1, wherein the at least one insert is structured in a region of the expansion compound.

7. The sandwich panel according to claim 1, wherein the at least one insert is at least in some sections circumferentially bonded to the core structure.

8. The sandwich panel according to claim 7, wherein the at least one insert has a body portion comprising a reduction in its cross section when compared to body portions on a side of the cover layers.

9. The sandwich panel according to claim 1, wherein the cells are honeycomb shaped.

10. The sandwich panel according to claim 1, wherein the insert is configured to form a force transmission point.

11. A sandwich panel with a core structure and cover layers arranged on each side of the core structure and being spaced apart from one another by a distance, wherein the core structure comprises a multitude of cells and with at least one insert for forming a local reinforcement wherein the at least one insert is arranged between the cover layers, wherein the at least one insert comprises two sections, filling a distance between a length of the at least one insert and the distance between the cover layers, wherein one section is cured at a time of installation of the sandwich panel, and another section is viscous during installation of the sandwich panel and which is cured and deformed in a forming of the sandwich panel.

12. The sandwich panel according to claim 11, wherein the cells are honeycomb-shaped.

13. The sandwich panel according to claim 11, wherein the insert is configured to form a force transmission point.

* * * * *